United States Patent [19]

Muro et al.

[11] Patent Number: 5,676,860
[45] Date of Patent: Oct. 14, 1997

[54] ELECTRIC DISCHARGE MACHINE WITH ELECTRODE OR OBJECT VIBRATION AND DETECTION OF ABNORMAL GAP CONDITION

[75] Inventors: Masahiro Muro, Toyonaka; Takeshi Masaki; Yoshihiro Ikemoto, both of Hirakata; Yoshinori Furusawa, Takarazuka, all of Japan

[73] Assignee: Matsushita Electric Industrial Co., Ltd., Osaka-Fu, Japan

[21] Appl. No.: 542,823

[22] Filed: Oct. 13, 1995

[30] Foreign Application Priority Data

Oct. 17, 1994 [JP] Japan .................. 6-250383

[51] Int. Cl.$^6$ .................. B23H 1/00; B23H 7/32
[52] U.S. Cl. .................. 219/69.2; 219/69.16; 219/69.17; 219/69.2
[58] Field of Search .................. 219/69.16, 69.19, 219/69.2, 69.15, 69.17

[56] References Cited

U.S. PATENT DOCUMENTS

| | | | |
|---|---|---|---|
| 3,610,865 | 10/1971 | Osenbruggen | 219/69.2 |
| 3,887,782 | 6/1975 | Wohlabaugh | 219/69.2 |
| 4,267,423 | 5/1981 | Bell, Jr. et al. | 219/69.19 |
| 4,365,133 | 12/1982 | Inoue | 219/69.2 |
| 5,340,959 | 8/1994 | Sawada et al. | 219/69.2 |

FOREIGN PATENT DOCUMENTS

| | | | |
|---|---|---|---|
| 0 272 640 | 6/1988 | European Pat. Off. . | |
| 0 636 443 | 2/1995 | European Pat. Off. . | |
| 2 465 551 | 3/1981 | France . | |
| 57-27622 | 2/1982 | Japan | 219/69.2 |
| 62-292322 | 12/1987 | Japan | 219/69.2 |
| 63-12730 | 3/1988 | Japan . | |
| 2-152729 | 6/1990 | Japan | 219/69.2 |
| 5-69238 | 3/1993 | Japan . | |
| 2 118 880 | 11/1983 | United Kingdom . | |

OTHER PUBLICATIONS

Proceedings pp. 19-20 of 1994 National Conference of Denki Kako Gakkai issued Oct. 17, 1994 by Shadan Hojin, Denki Kako Gakkai, entitled "Vibration-Aided Electric Discharge Machining for Fine Holes" (with English translation).

*Primary Examiner*—Geoffrey S. Evans
*Attorney, Agent, or Firm*—Wenderoth, Lind & Ponack

[57] ABSTRACT

In an electric discharge machine and machining method for processing an object through electric discharge by impressing a voltage between a processing electrode and the object, the processing electrode and object are relatively vibrated by a vibrating part using a piezoelectric element while a gap between the processing electrode and object is properly retained at all times. The electric discharge is accelerated when the gap is small, whereas the insulated state is maintained when the gap is large. This kind of condition is stably produced in accordance with a frequency of the vibration. If the frequency is set in the range of 50–500 Hz, a shortcircuit or an arc state is less likely to occur. The vibration is effective to quickly discharge processing debris at the discharging gap.

6 Claims, 5 Drawing Sheets

ELECTRIC DISCHARGE MACHINE WITH ELECTRODE OR OBJECT VIBRATION AND DETECTION OF ABNORMAL GAP CONDITION

BACKGROUND OF THE INVENTION

The present invention relates to electric discharge machine and method intended to speed up and stabilize minute electric discharge processing of an object on the order of not larger than hundreds of μm.

For transferring the shape of a processing electrode or processing a surface of an object highly accurately, i.e., on the order of μm or sub μm in minute electric discharge machining on the order of not larger than hundreds μm, a single shot of discharge energy of an electric discharge machine must be reduced to the order of $10^{-7}$ J. When the discharge energy is minimized as above, however, a discharging gap between the processing electrode and the object is several μm, thus causing the accumulation of processing debris or chips or, generation of shortcircuiting or an arc state therebetween easily. As such, when a circular hole is to be formed through the processing, the processing electrode is rotated to discharge the processing debris and to stimulate the reduction of the generation of shortcircuits or arc state so as to speed up and stabilize the process.

In the meantime, if a square hole or the like which is not circular is to be processed, in other words, when the processing electrode is not allowed to rotate for processing, a processing speed is poorly unpractical. Processing at a higher speed is consequently desired not only for square holes, but for circular holes alike.

SUMMARY OF THE INVENTION

The object of the present invention is therefore to provide an electric discharge machine and method which are provided with a means for promoting discharging of processing debris accumulated at a discharging gap and reducing the generation of shortcircuits or arc state between a processing electrode and an object-to-be-processed, thereby to speed up and stabilize minute discharge processing.

In accomplishing these and other objects, according to one aspect of the present invention, there is provided an electric discharge machine for processing an object through electric discharge by impressing a voltage between a processing electrode and the object, which comprises:

a detecting part for detecting presence/absence of a shortcircuit or arc state between the processing electrode and the object;

a driving part for driving the processing electrode or the object so as to increase a gap between an object-side end surface of the processing electrode and a surface of the object when the detecting part detects the shortcircuit or arc state and decrease the gap when the detecting part does not detect the shortcircuit nor the arc state; and a vibrating part for impressing a vibration between the processing electrode and the object relatively.

According to another aspect of the present invention, there is provided an electric discharge machining method for processing an object through electric discharge by impressing a voltage between a processing electrode and the object, which comprises steps of:

impressing a vibration between the processing electrode and the object relatively;

detecting presence/absence of a shortcircuit or arc state between the processing electrode and the object; and driving the processing electrode or object so as to increase a gap between an object-side end surface of the processing electrode and a surface of the object when the detecting part detects the shortcircuit or arc state and decrease the gap when the detecting part does not detect the shortcircuit nor the arc state.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE PREFERRED EMBODIMENTS

Figure 1:
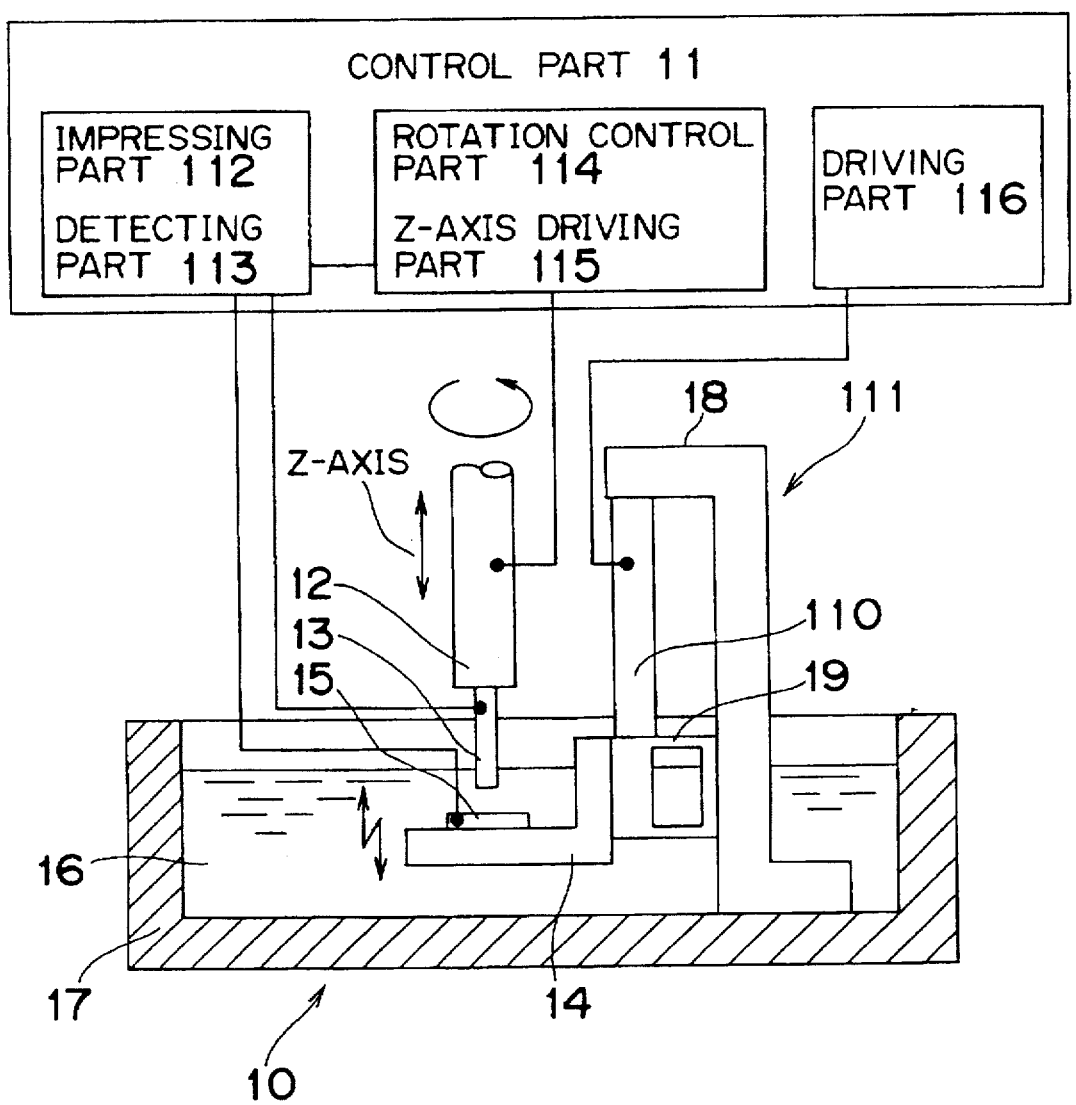
FIG. 1 is a structural diagram of an electric discharge machine according to one embodiment of the present invention.

Before the description of the present invention proceeds, it is to be noted that like parts are designated by like reference numerals throughout the accompanying drawings.

Preferred embodiments of the present invention will be described below with reference to the drawings.

FIG. 1 shows an electric discharge machine in one embodiment of the present invention, which includes a machine main body 10 and a control part 11. The main body 10 is a diesinking electric discharge machine. A processing electrode 13 held by a holding part 12 is set opposite to an object 15 to be processed which is held on a stage 14, via a minute gap in a Z-axis direction. The main body 10 has a vibrating part 111 which is so constructed that of an electrostrictive element such as a piezoelectric element 110 is pressured and connected between a column 18 fixedly set in a processing bath 17 containing a processing liquid 16 such as an insulating oil and a leaf spring 19 secured to the column 18. When the piezoelectric element 110 vibrates, the leaf spring 19 is elastically deformed correspondingly to the vibration, while the column 18 serves as a fixed end at this time. The vibration is transmitted to the object 15 via the stage 14 connected to the leaf spring 19.

Figure 6:
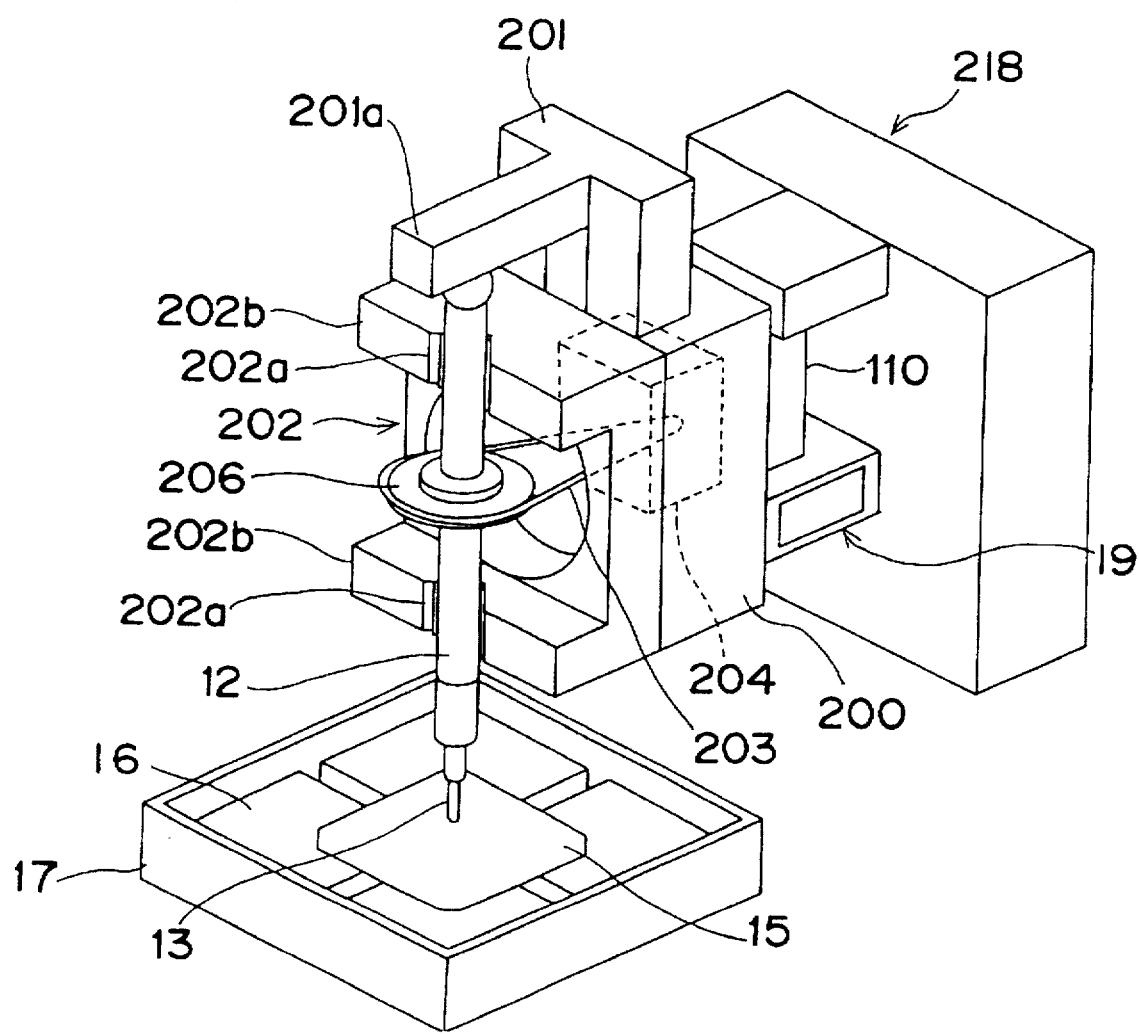
FIG. 6 is a perspective view showing an electric discharge machine according to another embodiment of the present invention.
Figure 7:
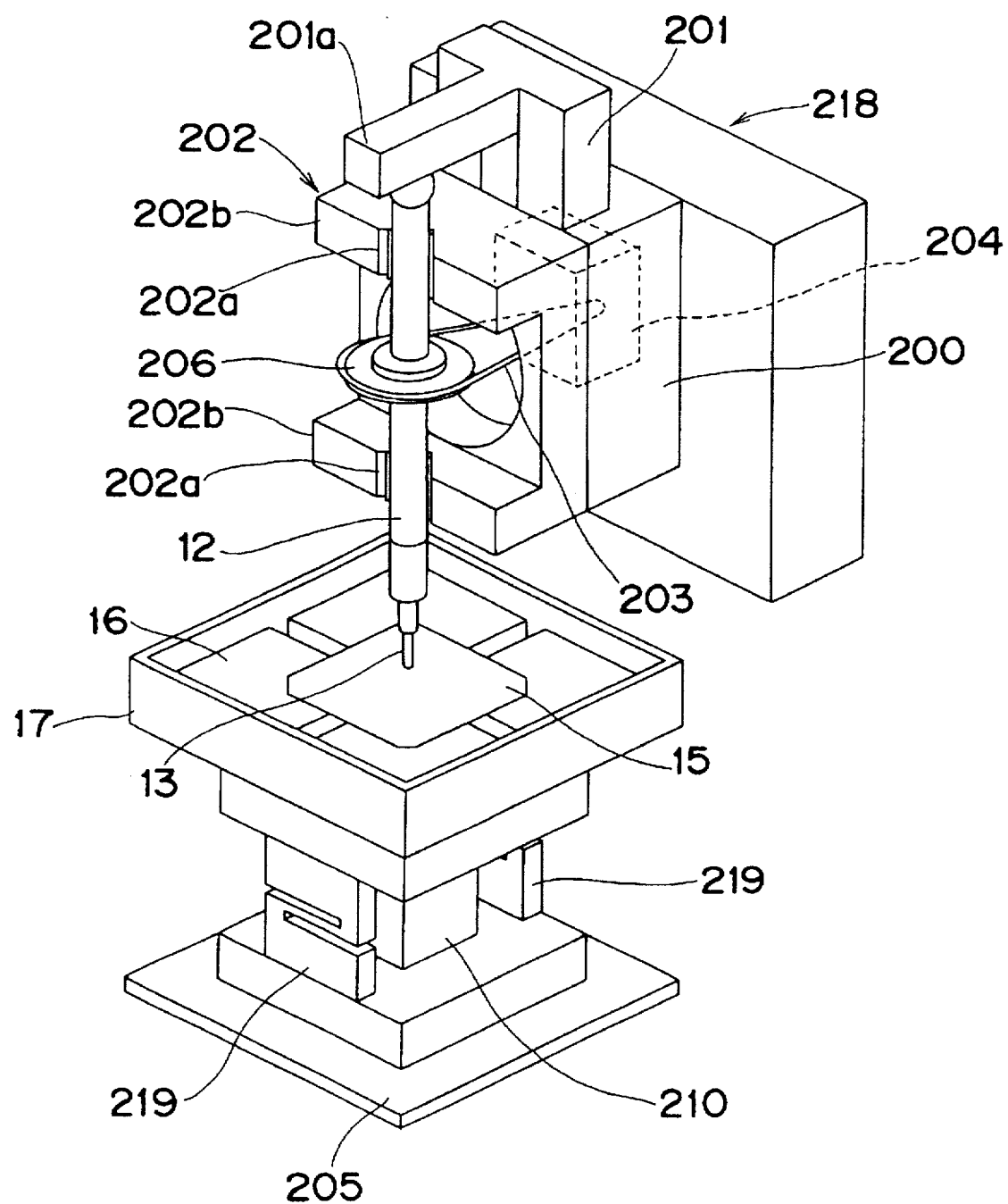
FIG. 7 is a perspective view showing an electric discharge machine according to still another embodiment of the present invention.

The control part 11 comprises an impressing part 112 for impressing a processing voltage between the processing electrode 13 and the object 15 via an RC circuit, a detecting part 113 for detecting the presence/absence of a shortcircuit between the electrode 13 and object 15, a control part 114 for rotating the processing electrode 13 via the holding part 12, a Z-axis driving part 115 for moving the processing electrode 13 in the Z-axis direction, and a driving part 116 for impressing an optional driving voltage to the piezoelectric element 110. The rotating control part 114 for rotating the processing electrode 13 is shown in FIGS. 6 and 7 by a motor, a belt, and a wheel described later. The driving part 115 during the processing operation drives the processing electrode 13 via the holding part 12 at a set constant feed speed in a +Z-axis direction (downward in FIG. 1) so as to reduce the gap between an object-side end surface of the electrode 13 and a surface of the object 15. An example of the driving part 115 is shown in FIGS. 6 and 7 by a T-shaped member 201, for example, connected to a driving cylinder, which is capable of moving in the holding part 12 in the Z-axis direction so as to adjust the position of the processing electrode 13 held by the holding part 13 in the Z-axis direction. The detecting part 113 may be constructed by an amperemeter for detecting an ampere of an electric current running through the processing electrode 13 and the object 15. When the detecting part 113 detects a shortcircuit between the electrode 13 and object 15, the driving part 115 drives the processing electrode 13 in a −Z-axis direction (upward in FIG. 1) to increase the gap between the electrode 13 and object 15.

Figure 2:
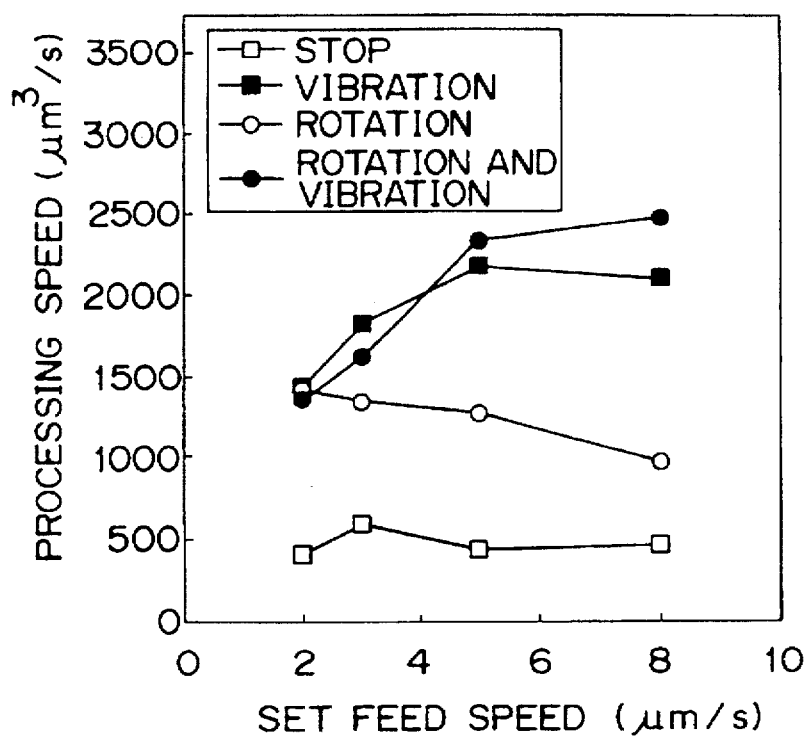
FIG. 2 is a graph showing the relationship between processing speeds and set feed speeds.

FIG. 2 is a graph showing a processing speed obtained by dividing a volume processed and removed from the object 15 by a time consumed for processing the object 15, and a set feed speed for the processing electrode 13 in the machine of FIG. 1. In the graph, four different kinds of cases are shown depending on the presence/absence of the rotation of the electrode 13 and the vibration of the object 15. That is, [STOP] represents a case where the processing electrode 13 is not rotated and the object 15 is not vibrated; [ROTATION] represents case where the processing electrode 13 is rotated, but the object 15 is not vibrated; [VIBRATION] represents a case where the processing electrode 13 is not rotated, whereas the object 15 is vibrated; and [ROTATION AND VIBRATION] represents a case where the processing electrode 13 is rotated and the object 15 is vibrated. The processing electrode 13 is rotated with a rotating frequency of 3000 rpm, and the object 15 is vibrated in sine waves in the Z-axis direction with an amplitude of 20 µm and a frequency of 100 Hz. Specifically, the object 15 of stainless is processed by the processing electrode 13 of pure tungsten having a diameter of 50 µm in the processing liquid 16 of mineral oil with using as a processing power source an RC circuit having a processing voltage of 80V, a resistance of 1.1 kΩ, and a capacity of 10 pF. The discharging gap between the electrode 13 and the object 15 is approximately 1 µm. Although the processing conditions and each material for the processing electrode 13 and object 15 are limited in the description of the embodiment, the effect of the present invention is always accomplished by the vibration under any conditions so long as the material is conductive. In a case where the object 15 is not vibrated, the processing speed is maximum when the set feed speed is 2–3 µm/s, and a shortcircuit or an arc state is brought about when the set feed speed is increased further than the above, with the result that the processing electrode 13 is separated from the object 15 more times and the processing speed is impossible to improve, rather deteriorated. Meanwhile, when the object 15 is vibrated and if the feed speed is set properly (4–8 µm/s), a processing speed as fast as five times that in the prior art is attained when the processing electrode 13 is not rotated, and also the processing speed as fast as twice that in the prior art is obtained with the rotation of the processing electrode 13.

Figure 3:
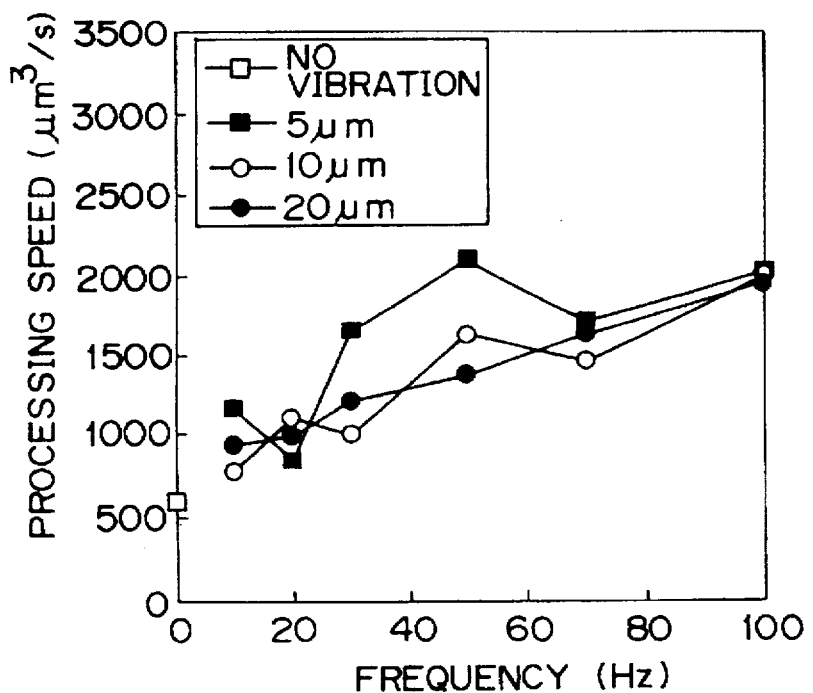
FIG. 3 is a graph of the relationship between the processing speeds and frequencies of vibrations.
Figure 4:
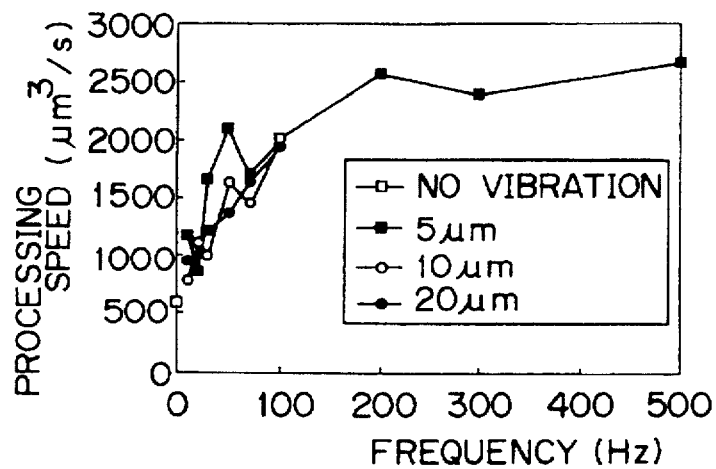
FIG. 4 is a graph showing the relationship between the processing speeds and the frequencies of the vibrations.

FIGS. 3 and 4 are graphs showing the relationship of the processing speed and a frequency of the vibration in the electric discharge machine in FIG. 1 where the vibration conditions are changed, the processing electrode 13 is always rotated, and the feed speed is set to be 8 µm/s. The other conditions are the same as discussed with reference to FIG. 2. The graphs make it clear that the processing speed is not significantly improved when the frequency is lower than 50 Hz. Moreover, the processing speed is not enhanced from the neighborhood above 200 Hz frequency, as shown in FIG. 4. Therefore, a high-frequency vibration demanding a vibration-prevention part is not required according to the present embodiment. The effect of the vibration is sufficiently obtained if the frequency is ½ or lower the practically used resonance frequency of the processing electrode, object, and holding part. The frequency of the vibration is accordingly set in the range of 50–500 Hz in the present embodiment.

Figure 5:
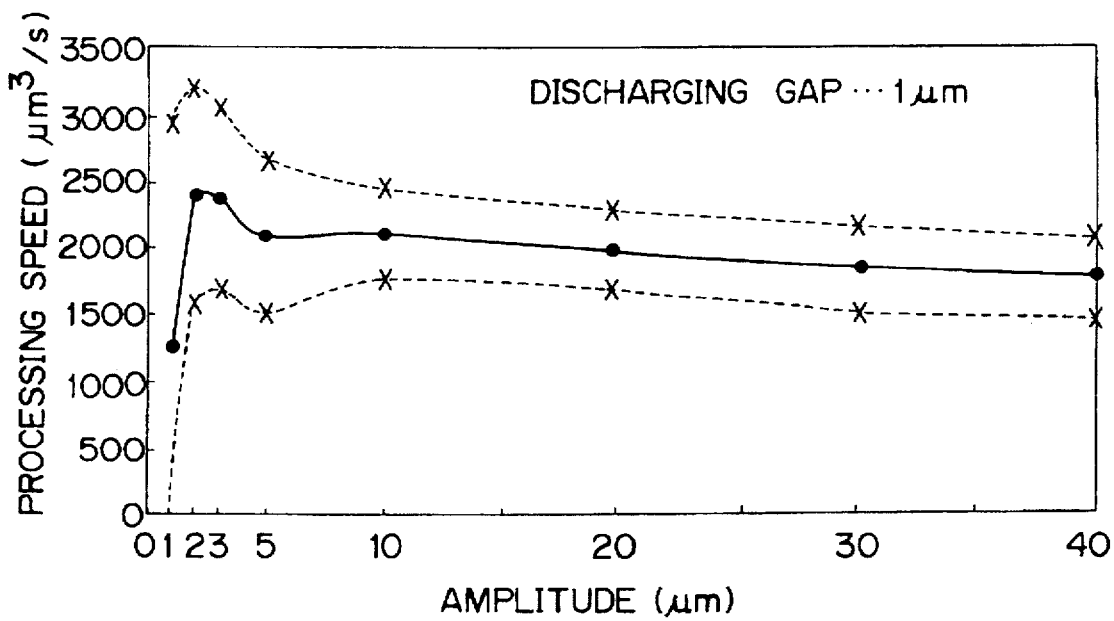
FIG. 5 is a graph of the relationship between the processing speeds and amplitudes of the vibrations.

FIG. 5 is a graph of the relationship between the processing speed and an amplitude of the vibration in the electric discharge machine described with reference to FIG. 1. In the graph, [●] is an average of processing results under the same conditions (discharging gap is 1 µm) and [x] represents an upper limit and a lower limit of irregularities. The frequency of the vibration is 100 Hz. While the processing speed becomes maximum when the amplitude is 2 µm (twice the discharging gap) or so, the processing variations become large if the amplitude is smaller than about 2 µm. From this, processing is stabilized with little variations when the amplitude is determined to be not smaller than twice the discharging gap. Since the processing speed is gradually lowered if the amplitude is increased by a higher rate, that is, by a rate higher than twice the discharging gap, the amplitude is set to be not larger than 40 times the discharging gap. This amplitude is favored also for the purpose of smooth driving of the piezoelectric element.

FIG. 6 is a perspective view showing an electric discharge machine according to another embodiment of the present invention. The embodiment of FIG. 6 is similar to that of FIG. 1 except for that the vibrating part 111 is not supported within the processing bath 17 but is supported outside the processing bath 17. That is, the lower end of the piezoelectric element 110 is connected to a fixed plate 218 via the leaf spring 19 and the upper end of the piezoelectric element 110 is directly connected to the fixed plate 218. A first support plate 200 is connected to the leaf spring 19 so as to be moved in the Z-axis direction by the vibrations caused by the piezoelectric element 110. The holding part 12 holding the processing electrode 13 is rotatably supported within V-shaped grooves 202a of upper and lower side ends of C-shaped portion 202b of a second support plate 202 fixed to the front surface of the first support plate 200. A wheel 206 is fixed to the middle section of the holding part 13 and is rotated via a belt 203 by a motor 204 accommodated in the first support plate 200. A spherical upper end of the holding part 13 is brought into contact with an end 201a of a T-shaped member 201, for example, connected to a driving cylinder, which is capable of moving in the first support plate 200 in the Z-axis direction so as to adjust the position of the processing electrode 12 held by the holding part 13 in the Z-axis direction. The processing electrode 13 is moved in the Z-axis direction by the vibrations of the piezoelectric element 110 while rotated by the motor 204.

FIG. 7 is a perspective view showing an electric discharge machine according to still another embodiment of the present invention. The embodiment of FIG. 7 is similar to that of FIG. 6 except for that the vibrating part is arranged on the side of the object 15. That is, the first support plate 200 is directly fixed to the fixed plate 218 without the piezoelectric element 110 and the leaf spring 19. Instead, the processing bath 17 is supported by two springs 219 on a base 205 while the processing bath 17 is connected to the base 205 via a piezoelectric element 210 arranged between the springs 219 so as to impress the vibrations to the object 15 via the processing bath 17.

According to the embodiments in FIGS. 6 and 7, the same effects can be obtained which are obtained in the embodiment in FIG. 1.

In the electric discharge machine processing an object by impressing a voltage between the processing electrode and the object, the detecting part which detects the presence/absence of the shortcircuit or arc state between the processing electrode and the object drives the processing electrode or the object to increase the gap when detecting the shortcircuit or arc state and decrease the gap when not detecting the shortcircuit or arc state, so that the gap is properly maintained at all times. If a vibrating part constituted by utilizing a piezoelectric element vibrates the processing electrode and/or the object, the electric discharge is proceeded when the gap is decreased, and the insulated state is maintained when the gap is enlarged. Moreover, the vibration accelerates discharging of processing debris at the discharging gap.

If the above vibration is set to be in a low frequency band of 50–500 Hz, the electric discharge is executed at high speeds, and adverse influences by the vibration can be eliminated. More specifically, when the frequency of the vibration is set to be not lower than 50 Hz as in FIG. 3, the processing speed is enhanced by 2–4 times that without the vibration, so that the electric discharge is increased. It is preferably that the frequency is not lower than 100 Hz as is understood from FIG. 4, whereby the processing speed is improved to 4–5 times in comparison with a case in which vibration is not impressed, so that the electric discharge is further increased. The speed-up reaches its peak when the frequency is about 200 Hz. The processing speed is not improved even if the frequency is increased further than this value. Such a high-frequency vibration, which would necessitate a vibration-prevention part, is accordingly not required. A sufficient effect of the vibration is achieved with not higher than ½ a practically known resonance frequency of the processing electrode, object, and a holding part therefor. Therefore, if the frequency of the vibration is set to be not higher than 500 Hz, ½ the resonance frequency or lower resonant frequency is ensured with good safety. Although the vibration with the frequency of 50–500 Hz speeds up the stable electric discharge without using a vibration-prevention part as described above, more desirably, the frequency should be 100–300 Hz.

When an amplitude of the vibration is set to be 2–40 times the discharging gap between the object-side end surface of the processing electrode and the surface of the object, the processing speed is stabilized. In other words, if the amplitude is smaller than twice the discharging gap, as shown in FIG. 5, the processing speed is altered, making stable electric discharge difficult to achieve. On the other hand, if the amplitude is made large, the processing speed is gradually lowered. As such, the amplitude of the vibration is set to be not larger than 40 times the discharging gap, which is favorable also from the viewpoint of smooth operation of the piezoelectric element.

Needless to say, the electric discharge may be speeded up and stabilized under optimum conditions if the frequency and the amplitude of the vibration are respectively set in the above-discussed ranges.

As described hereinabove, according to the present invention, processing debris gathering at the discharging gap are quickly discharged, thereby reducing the generation of shortcircuits or arc state between the processing electrode and object to be processed. The electric discharge machine of the present invention is accordingly able to process the object stably, at high speeds.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An electric discharge machine for processing an object through electric discharge by impressing a voltage between a processing electrode and the object, the electric discharge machine comprising:

a detecting part for detecting the presence or absence of a short-circuit or arc state between the processing electrode and the object;

a driving part for driving the processing electrode or the object so as to increase a gap between an end surface of the processing electrode and a surface of the object when the detecting part detects the short-circuit or arc state and decrease the gap when the detecting part does not detect the short-circuit or arc state; and a vibrating part including a piezoelectric element for impressing a relative vibration between the processing electrode and the object, wherein the vibration impressed is of a frequency in the range of 50–500 Hz.

2. The electric discharge machine as claimed in claim 1, wherein the vibration impressed has an amplitude of 2–40 times the gap between the processing electrode end and the object.

3. An electric discharge machine for processing an object through electric discharge by impressing a voltage between a processing electrode and the object, the electric discharge machine comprising:

a detecting part for detecting the presence or absence of a short-circuit or arc state between the processing electrode and the object;

a driving part for driving the processing electrode or the object so as to increase a gap between an object-side end surface of the processing electrode and a surface of the object when the detecting part detects a short-circuit or arc state, and decrease the gap when the detecting part does not detect a short-circuit or arc state; and a vibrating part which includes a piezoelectric element for impressing a relative vibration between the object-side end surface of the processing electrode and the surface of the object, wherein the vibration impressed has an amplitude in the range of 2–40 times the gap.

4. An electric discharge machining method for processing an object through electric discharge by impressing a voltage between a processing electrode and the object, the method comprising:

impressing a relative vibration, having a frequency in the range of 50–500 Hz, between the processing electrode and the object, wherein the vibration is generated with a vibrating part which includes a piezoelectric element;

detecting a presence or an absence of a short-circuit or arc state between the processing electrode and the object; and driving the processing electrode or object so as to increase a gap between an object-side end surface of the processing electrode and a surface of the object when the detecting part detects a short-circuit or arc state, and decrease the gap when the detecting part does not detect a short circuit or the arc state.

5. The electric discharge machining method as claimed in claim 4, wherein the vibration impressed by the piezoelectric element has an amplitude in the range of 2–40 times the gap.

6. An electric discharge machining method for processing an object through electric discharge by impressing a voltage between a processing electrode and the object, the method comprising:

impressing a relative vibration, between the processing electrode and the object, wherein the vibration is generated with a vibrating part, which includes a piezoelectric element;

detecting a presence or an absence of a short-circuit or arc state between the processing electrode and the object; and driving the processing electrode or object so as to increase a gap between an object-side end surface of the processing electrode and a surface of the object when the detecting part detects a short-circuit or arc state, and decrease the gap when the detecting part does not detect a short circuit or arc state, wherein the vibration impressed between the processing electrode and the object has an amplitude of 2–40 times the gap.

* * * * *